H. N. ATWOOD.
ELECTRIC METER.
APPLICATION FILED AUG. 20, 1908.

981,235.

Patented Jan. 10, 1911.

3 SHEETS—SHEET 1.

Witnesses:
George H. Tilden
J. Ellis Glen

Inventor,
Harry N. Atwood,
By Albert H. Davis
Att'y.

H. N. ATWOOD.
ELECTRIC METER.
APPLICATION FILED AUG. 20, 1908.

981,235.

Patented Jan. 10, 1911.

3 SHEETS—SHEET 3.

Witnesses:
George H. Tilden
J. Ellis Glen.

Inventor,
Harry N. Atwood,
By Albert H. Davis
Att'y.

UNITED STATES PATENT OFFICE.

HARRY N. ATWOOD, OF LYNN, MASSACHUSETTS, ASSIGNOR TO GENERAL ELECTRIC COMPANY, A CORPORATION OF NEW YORK.

ELECTRIC METER.

981,235.      Specification of Letters Patent.     Patented Jan. 10, 1911.

Application filed August 20, 1908. Serial No. 449,412.

*To all whom it may concern:*

Be it known that I, HARRY N. ATWOOD, a citizen of the United States, residing at Lynn, county of Essex, State of Massachusetts, have invented certain new and useful Improvements in Electric Meters, of which the following is a specification.

My invention relates to electric meters, and more particularly to that type of meter which has an armature which rotates in a conducting liquid, such as mercury, and has for its object certain improvements in the construction of such meters as will render them more reliable and cheaper to construct.

The object of my invention is to construct a meter with an armature revoluble in mercury, or what is commonly known as a mercury meter in a strong and substantial manner, and at the same time have it accurate.

I accomplish the object of my invention by certain improvements which consist in making a compact structure for the armature and the retaining members.

I also employ a damping magnet to give the required retardation to the armature, and provide a novel form of magnetic shunt in order to provide for the calibration of the meter.

Further improvements, which I have made in the construction of my new meter, are pointed out more particularly in the appended claims.

For a further understanding of my invention reference may be made to the accompanying drawings where—

Figure 1:
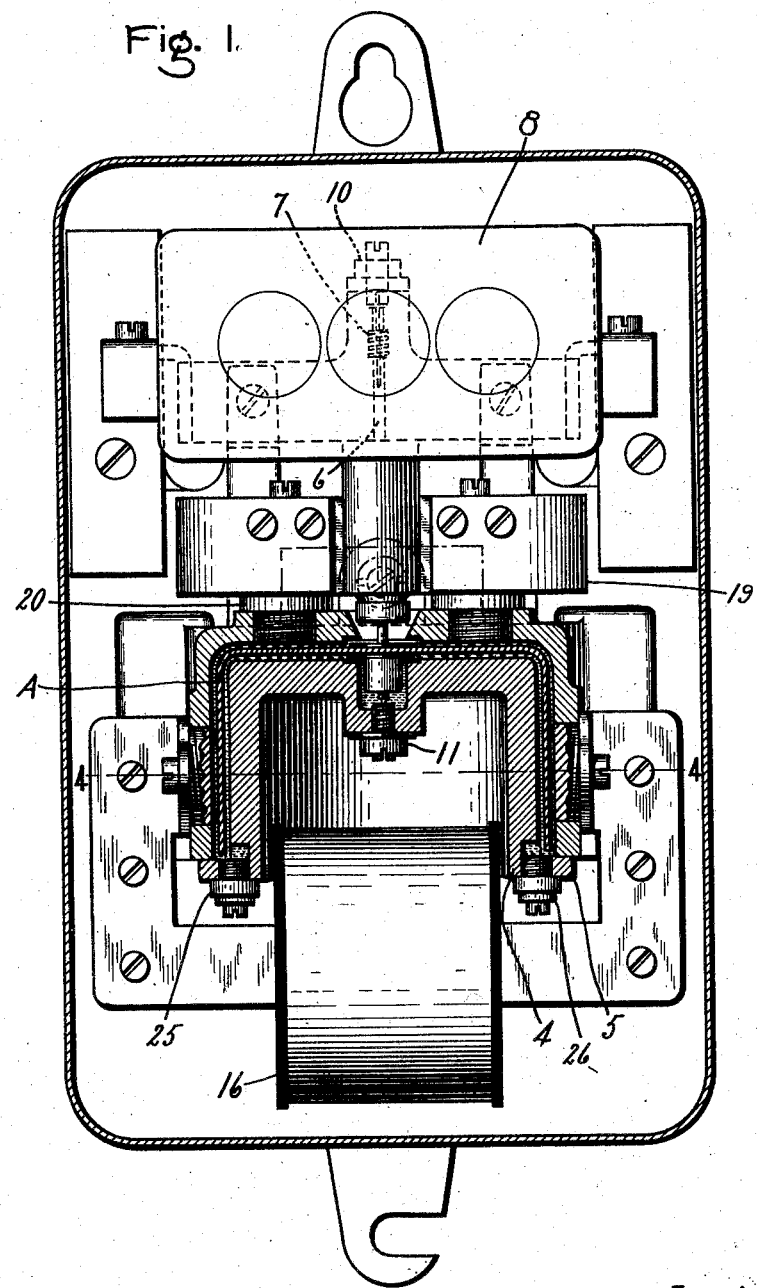
Figure 2:
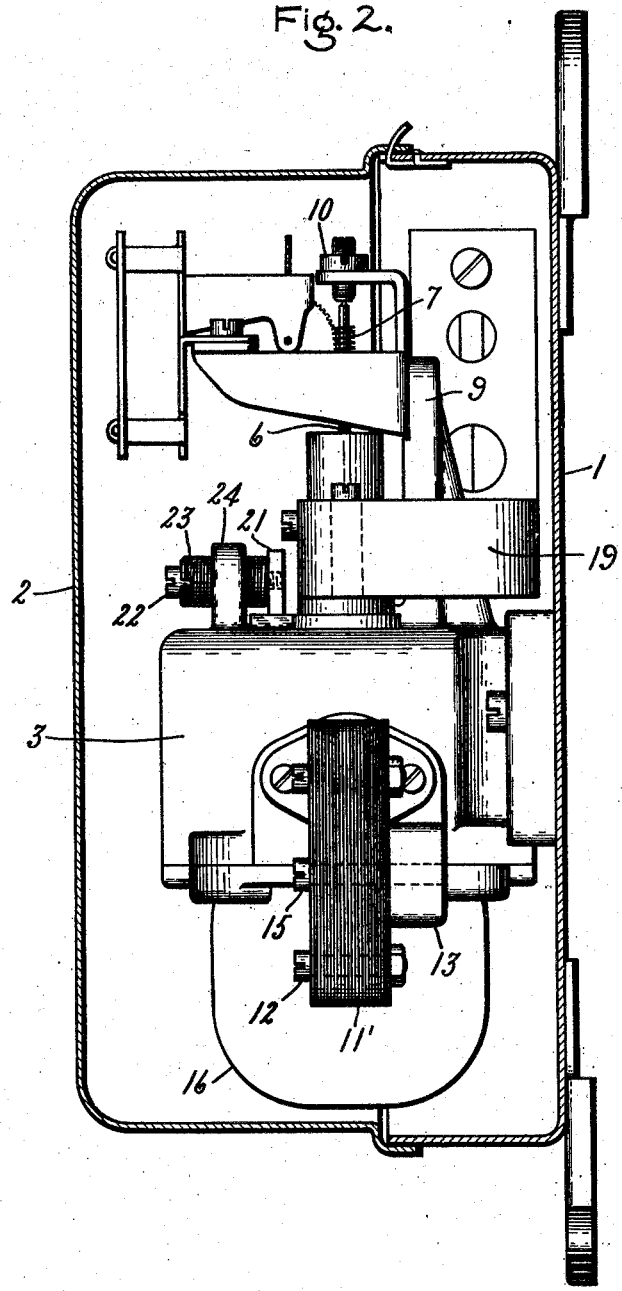
Figure 3:
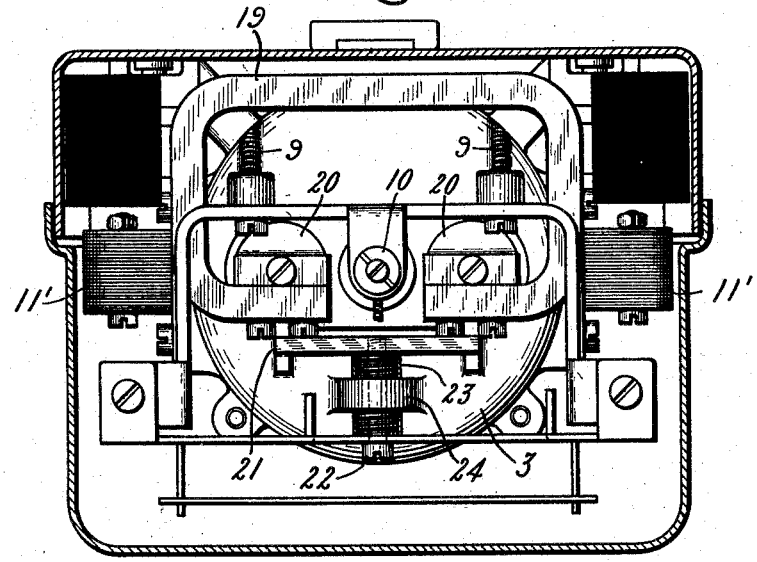
Figure 4:
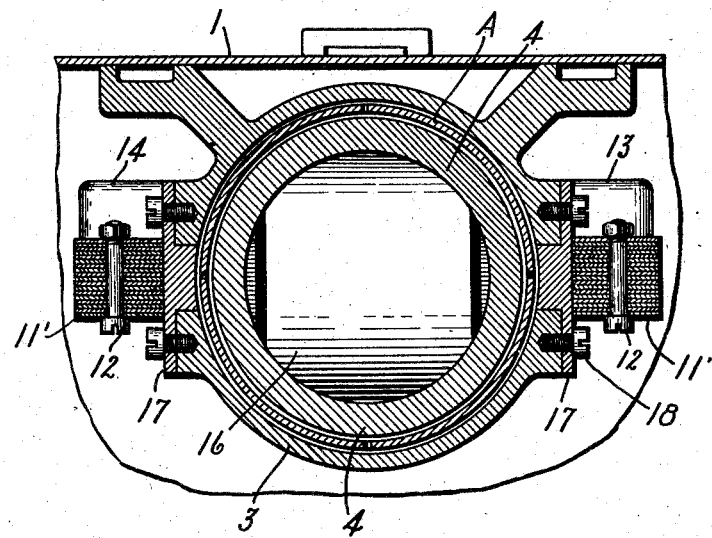

Figure 1 is a front view of my meter with the cover removed, a portion of the meter being shown in section for a better understanding of its construction; Fig. 2 is a side view with the cover and the back partially cut away; Fig. 3 is a plan view with the top of the cover and back cut away; and Fig. 4 is a section on line 4—4 of Fig. 1.

I have shown a back 1, to which may be attached a cover 2 in any well known manner. Attached to it I have shown a member 3, which is formed in the shape of an inverted cup with suitable lugs for attaching it to the back 1 and other lugs, which will be described in detail farther on. I have shown member 4, which is also constructed in the shape of an inverted cup and fits within the interior of the cup-shaped portion of member 3, having a projecting shoulder 5, which rests against the bottom of the cup-shaped portion of member 3. Member 4 is secured to member 3 in any well known fashion, and is so constructed that there will be between its outside surface and the inside surface of the cup-shaped portion of 3 a space within which fits armature A made in some conducting material such as copper, this armature being also formed in the shape of an inverted cup and fitting within the space between members 4 and 3. This space may be filled with any conducting fluid, but I prefer the use of mercury for a conducting fluid. Armature A is attached to shaft 6, which drives by any suitable means, such as a worm-wheel 7, a gear-train 8 for registering the consumption of energy passing through the meter. This gear-train may be fastened in any well known manner to lugs 9, which are an integral portion of member 3. I have shown an upper bearing 10, in which the upper portion of the meter shaft bears, and also a lower bearing 11, in which the lower portion of shaft 7 bears, member 4 being fashioned so as to permit of the use of such a bearing. I have shown a core 11', which may be made of laminæ of a magnetic material; these laminæ being held together by bolts 12. Integral with member 3 I have shown lugs 13 and 14, to which the magnetic core may be fastened by screws 15. I have shown coil 16 surrounding the magnetic core, which coil is a potential coil, and serves to produce a magnetic field varying with the voltage on the system whose energy it is required to measure. I have shown pole-pieces 17 for core 11' attached to member 3 and passing through member 3, as shown in Fig. 4, so as to come into close operative relation with the armature.

In addition to the field producing magnet 11', I have shown a damping magnet 19, which is a permanent magnet, and has its ends fastened to pole-pieces 20, which are screwed into suitable holes formed in the top of member 3, so that these pole-pieces will also come into close operative relation with the meter armature. I have shown a magnetic plate 21 movable away from the poles of magnet 19 in a direction at right angles to the flux between these poles and acting as a shunt-circuit for the flux, so as to change the damping action of the permanent magnet upon the armature in the manner well known to those skilled in the art.

Fastened to plate 21, I have shown a screw 22 encircling which and loosely fitting on which I have shown a larger screw 23, which passes through, and is in operative relation with a suitably threaded hole formed in lug 24, which is an integral portion of member 23. It will be obvious that by moving screw 23 in a right-handed or left-handed direction that plate 21 will be moved to or away from the poles of the damping magnet, and thus the armature will be affected by the damping magnet to a greater or less extent.

At the bottom of inner member 4 I have shown two binding-posts 25 and 26, to which may be attached the current conductors in the well known fashion.

The operation of my meter will then be as follows: A current depending upon the strength of the current to be measured will pass from one of the binding-posts 25, 26, to the other binding-post, through the meter armature, and this current, acting in conjunction with the field created by potential coil 16, will cause the armature to revolve at a rate proportional to the energy consumption of the circuit. The rotation of the armature will be hindered by the eddy-currents due to the field created by the potential coil 16, and also by the field created by the damping magnet 19.

It will be obvious to those skilled in the art that if I so desire I may replace core 11' and potential coil 16 by a permanent magnet, so that the rate of rotation of the armature will be solely dependent upon the strength of the current flowing through it, and then my meter will register amperes and not watts.

While I have described a certain form in which my invention may be carried out, I do not limit myself to this form, as many other forms, which do not depart from the spirit of my invention, will be obvious to those skilled in the art; which forms I seek to cover in the appended claims.

What I claim as new and desire to secure by Letters Patent of the United States, is,—

1. In an electric meter, an inverted cup-shaped mercury receptacle, an armature therein, a torque producing magnet with poles in operative relation to the sides of the armature, and a damping magnet with poles in operative relation to the top of said armature.

2. In an electric meter, an inverted cup-shaped mercury receptacle, an armature therein, a torque producing magnet with poles in operative relation to the sides of the armature, and a damping magnet with poles in operative relation to the top of said armature, and means for adjusting the effect of the damping magnet on the armature.

3. In an electric meter, an inverted cup-shaped mercury receptacle, an armature therein, a torque producing magnet with poles in operative relation to the sides of the armature, and a damping magnet with poles in operative relation to the top of said armature, and an adjustable magnetic shunt for shunting a portion of the flux of the damping magnet from the armature.

4. In an electric meter, an inverted cup-shaped mercury receptacle, an armature therein, a magnet with poles in operative relation with the sides of said armature, and a second magnet with poles in operative relation with the top of said armature.

5. In an electric wattmeter, a mercury receptacle, an armature therein, a magnetic core with poles in operative relation with the armature, a potential coil surrounding said core, conductors in operative relation with the edges of the armature to cause current to flow through the armature from one edge to the other, a damping magnet with poles in operative relation to the armature, and an adjustable magnetic shunt for adjusting the effect on said armature of the damping magnet.

6. In an electric meter, a member with an inverted cup-shaped opening, a second member within said opening inclosing the same so as to leave a space between the members, mercury filling said space, an armature in said space, conductors leading to said space on diametrically opposite sides of the armature, a magnetic core with poles extending through the exterior member to the space, supported by said member and surrounded by a potential coil, a permanent magnet with poles extending through the exterior member to the space, and an adjustable magnetic shunt in operative relation with the poles of said magnet.

In witness whereof, I have hereunto set my hand this eighteenth day of August, 1908.

HARRY N. ATWOOD.

Witnesses:
ALVARADO LE ROY ELLIS,
JOHN A. McMANUS, Jr.